April 7, 1925. 1,532,549

N. RANSIER

SAFETY HOSE CLAMP

Filed Aug. 24, 1922

INVENTOR
Nelson Ransier

Patented Apr. 7, 1925.

1,532,549

UNITED STATES PATENT OFFICE.

NELSON RANSIER, OF ARLINGTON, NEW JERSEY.

SAFETY HOSE CLAMP.

Application filed August 24, 1922. Serial No. 583,974.

*To all whom it may concern:*

Be it known that I, NELSON RANSIER, a citizen of the United States, and a resident of Arlington, in the county of Hudson and State of New Jersey, have invented a new and useful Safety Hose Clamp, of which the following is a specification.

The invention relates to a safety hose clamp, particularly adapted to firmly hold a flexible gas hose to its connection.

It frequently happens where the common type of flexible gas hose is connected to a gas jet or fixture for the purpose of supplying gas to an iron, gas stove or other appliance that the hose will be pulled off while the gas is turned on thus tending to fill the room with gas and endanger the lives of any occupants of the room.

The purpose of this invention is to provide a device that will prevent any occurrence of this menace and one that is cheap to manufacture, simple to adjust in place and efficient in use.

The invention will be described in the following specification and illustrated in the drawings, of which—

Figure 1:
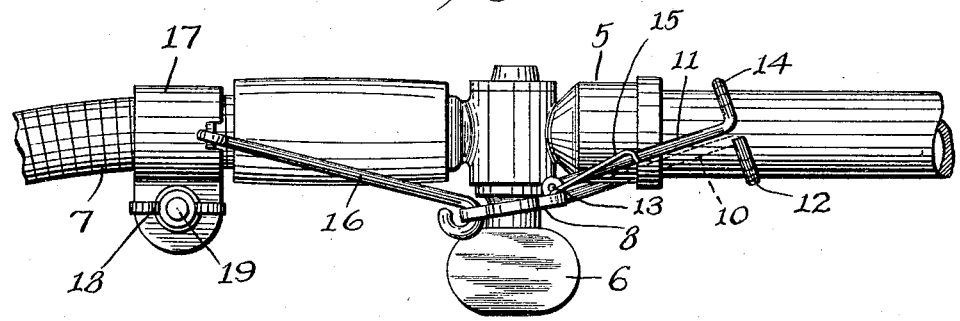
Fig. 1 is a side view of the device showing it in position on a gas fixture holding the flexible hose in place.
Figure 2:
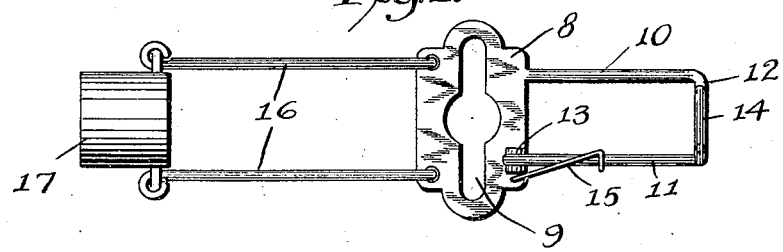
Fig. 2 is a plan view of the device.
Figure 3:
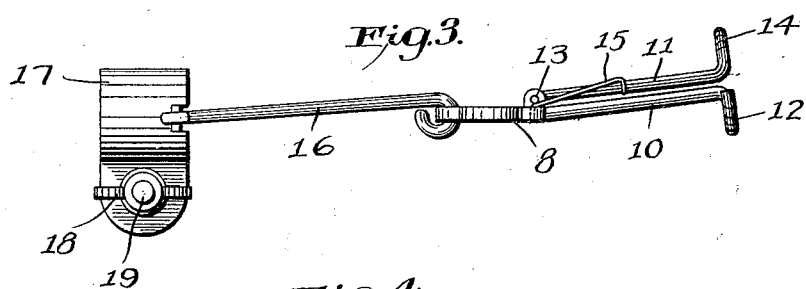
Fig. 3 is a side view.
Figure 4:
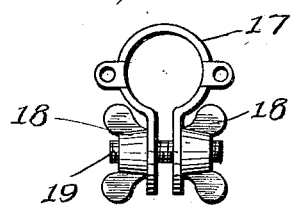
Fig. 4 is an edge view of the clamping member.

The reference numeral 5 designates a form of gas fixture which has the conventional handle 6 for turning the gas on or off. The flexible hose connection 7 is attached to the fixture.

A plate 8 having a slot to accommodate the handle of the fixture is provided. In the position shown in Fig. 1 the gas is turned on but when the gas is turned off and the handle is at right angles to the position shown in Fig. 1, it is slipped through the slot 9, and after the handle has been turned, it cannot be displaced.

In order to positively prevent it being displaced a pair of arms 10 and 11 are provided. The arm 10 is rigid or integral with the plate and has a curved part 12 at its outer end to embrace the gas fixture. The arm 11 is pivoted to the plate at 13 and also has a curved part 14 at its outer end, to embrace the fixture. A spring 15 holds the part 14 against the fixture and readily permits of its being attached or removed from said fixture.

Pivoted to the opposite side of the plate are a pair of arms 16, to which is pivoted at their outer ends the clamping member or collar 17. This as shown is a split collar and is readily clamped and held to the flexible hose by the wing nuts 18 and stud 19.

From the foregoing it is clear that any sudden pull or jerk on the flexible hose will not disconnect it from the fixture as this collar 17, which is firmly held in place by the plate 8 will prevent any movement of the hose from the fixture.

Due to its construction, the device is readily applicable to any form of gas fixture and numerous changes might be made in the arrangement of the device without departing from the scope of the claim.

What I claim as new is:

A device for preventing a hose from being disconnected from a gas fixture having in combination a collar, means on said collar to clamp it to said hose, a slotted plate to engage the handle of said gas fixture, arms pivotally connecting said collar to said plate and another pair of arms connected to said plate to engage a part of said gas fixture to prevent said plate from becoming disengaged with said handle.

NELSON RANSIER.